(12) United States Patent
Fukano et al.

(10) Patent No.: US 6,903,869 B2
(45) Date of Patent: Jun. 7, 2005

(54) ILLUMINATION SYSTEM FOR MICROSCOPY AND OBSERVATION OR MEASURING METHOD USING THE SAME

(75) Inventors: Takashi Fukano, Wako (JP); Atsushi Miyawaki, Wako (JP); Keiji Shimizu, Fussa (JP); Yoshihiro Kawano, Hicksville, NY (US)

(73) Assignee: Olympus Corporation, Tokyo (JP)

( * ) Notice: Subject to any disclaimer, the term of this patent is extended or adjusted under 35 U.S.C. 154(b) by 13 days.

(21) Appl. No.: 10/301,631

(22) Filed: Nov. 22, 2002

(65) Prior Publication Data

US 2003/0161039 A1 Aug. 28, 2003

(30) Foreign Application Priority Data

Nov. 26, 2001 (JP) ........................................ 2001-359710

(51) Int. Cl.⁷ ............................................... G02B 21/00
(52) U.S. Cl. ........................ 359/370; 359/368; 359/369
(58) Field of Search ................................... 359/368–398

(56) References Cited

U.S. PATENT DOCUMENTS

| | | | | | |
|---|---|---|---|---|---|
| 5,479,238 A | * | 12/1995 | Whitney | ....................... | 355/53 |
| 5,847,851 A | * | 12/1998 | Wechsler et al. | .............. | 359/7 |
| 6,312,134 B1 | * | 11/2001 | Jain et al. | .................... | 359/855 |

* cited by examiner

*Primary Examiner*—Drew A. Dunn
*Assistant Examiner*—Joshua L Pritchett
(74) *Attorney, Agent, or Firm*—Kenyon & Kenyon

(57) ABSTRACT

An illumination system for microscopy includes a light source, a first spectral element dispersing light from the light source, a reflecting member selectively reflecting light dispersed by the first spectral element, a second spectral element combining light reflected by the reflecting member, a dichroic mirror, an objective lens, and an image sensor. The first spectral element is placed at the front focal point of a first lens, the reflecting member is placed at a position where the back focal point of the first lens coincides with the front focal point of a second lens, and the second spectral element is placed at the back focal point of the second lens.

15 Claims, 7 Drawing Sheets

Fig. 3A
Fig. 3B
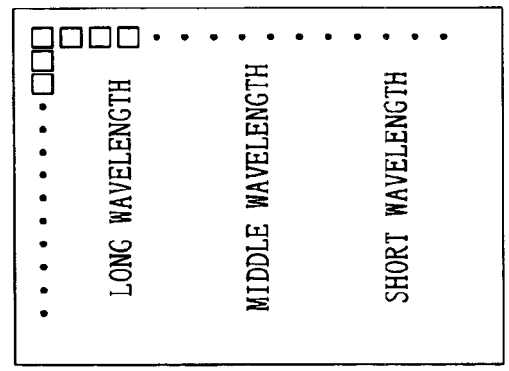
Fig. 4A
Fig. 4B
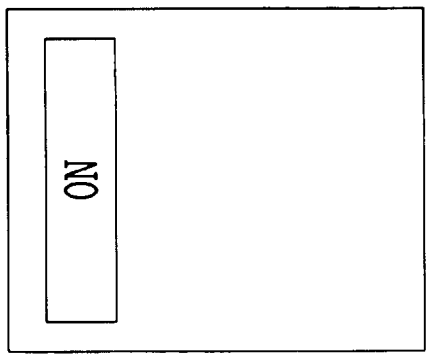
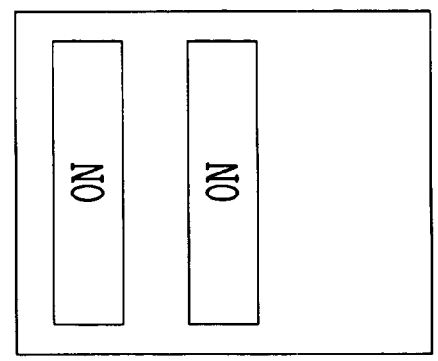
Fig. 4C
Fig. 4D
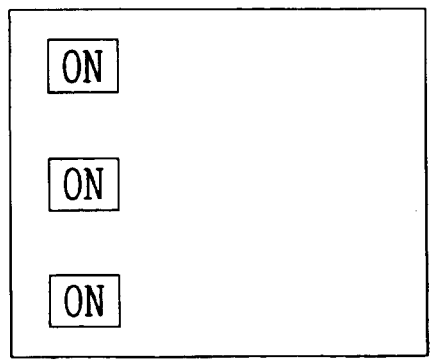
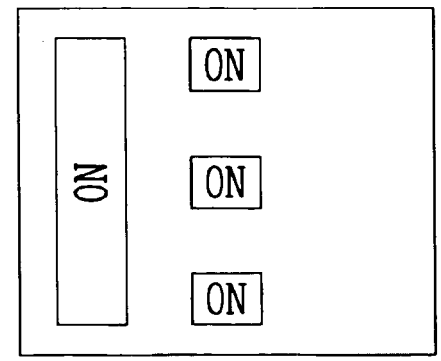

ILLUMINATION SYSTEM FOR MICROSCOPY AND OBSERVATION OR MEASURING METHOD USING THE SAME

BACKGROUND OF THE INVENTION

1. Field of the Invention

This invention relates to an illumination system for microscopy, such as that in a fluorescence microscope or a spectral microscope, and an observation or measuring method using this illumination system.

2. Description of Related Art

There are demands that microscopes should be used for high-speed observations of the behavior of molecules, the behavior of intracellular molecules, and the physiological behavior of living cells. In this case, a sample must be illuminated in such a way that light with a plurality of wavelengths is switched at a high speed.

In a conventional device, as disclosed in Japanese Patent Kokai No. Hei 9-5243, a plurality of excitation filters are mounted to a fluorescence microscope, and excitation light of different wavelengths has been switched by rotating their filter wheel.

However, with the switching technique described in Kokai No. Hie 9-5243, it is difficult to switch the wavelength at a high speed. This is attributable to problems that much time is required for changeover in excitation wavelength, the changeover of the excitation filter is required, vibration occurs, and simultaneous illumination cannot be achieved with a plurality of wavelengths.

In recent years, calcium indicators prepared on the basis of fura-2, BTC, and GFP (Green Fluorescent Protein) have been developed in particular and utilized by many researchers. As examples of these indicators, ratiometric-pericam and a pH indicator (pHluorin) are cited. Either of them is a dual wavelength excitation/single wavelength photometry type indicator.

Whenever such an indicator is used for dual wavelength excitation with single wavelength photometry, excitation light with two different wavelengths has been alternated by switching the excitation filter.

In this case, however, the problems arise that a switching speed is low, it is hard to control the balance between the intensities of excitation light with two wavelengths, and a mechanical vibration is produced when the filter is switched.

There are further demands that microscopes and caged indicators should be used to experimentally carry out high-speed observations of the behavior of molecules, the behavior of intracellular molecules, and the physiological behavior of living cells. When the concentration of calcium ions should be increased with respect to only a particular part of the cell or the concentration of a particular substance should be increased with respect to the particular part, a caged compound is used for experiment. The caged compound has the characteristic that when the compound is irradiated with ultraviolet light of wavelength 300–360 nm, it brings about a photochemical change to discharge a particular substance. An illumination system is required in which this caged reagent is loaded on the cell and the particular part of the cell is irradiated with ultraviolet rays to release the cage.

When the caged indicator is used, a costly UV laser has been required for irradiation. Alternatively, experiment has been required in which a filter wheel is mounted to a microscope to switch a filter for ultraviolet light to a filter for fluorescence observation. Since it is difficult to rotate the filter wheel at a high speed, the improvement of time resolution is impaired.

Furthermore, in the conventional microscope, as disclosed in German Patent Laid-Open Specification No. 2,626,540, a reflecting interference microscope can be used to form an image, but it is not easy to switch the illumination wavelength of reflecting interference. In the conventional microscope, it is required that the filter wheel is mounted to provide filters of different wavelengths and an image is formed in accordance with each wavelength. Moreover, the use of a plurality of costly band-pass filters involves a large expense.

SUMMARY OF THE INVENTION

It is, therefore, an object of the present invention to provide an illumination system for microscopy in which a troublesome changeover of the excitation filter for fluorescence can be eliminated and in which simultaneous illumination can be achieved with arbitrary wavelengths or a plurality of wavelengths.

In order to accomplish the above object, the illumination system for microscopy according to the present invention includes a light source for illuminating a sample, a first spectral element dispersing light from the light source, a selectively reflecting member selectively reflecting light dispersed by the first spectral element, a second spectral element combining light reflected by the selectively reflecting member, a dichroic mirror, an objective lens, and an image sensor.

According to the present invention, in an ordinary microscope, spectral illumination becomes possible without using an integrating sphere.

According to the illumination system of the present invention, the wavelength can be switched at a high speed and without producing vibration, in contrast with the conventional microscope in which the filter wheel is used to switch the excitation wavelength for fluorescence.

Further, according to the illumination system of the present invention, a sample can be illuminated with arbitrary wavelengths or a plurality of wavelengths at the same time and the plurality of wavelengths can be separately controlled with respect to brightness.

Still further, according to the illumination system of the present invention, a fluorescent image which has minimal fading and is bright can be obtained.

This and other objects as well as the features and advantages of the present invention will become apparent from the following detailed description of the preferred embodiments when taken in conjunction with accompanying drawings.

BRIEF DESCRIPTION OF THE DRAWINGS

FIG. 3A is a view showing a slit of rectangular shape, located at the position of a stop, in the case where light dispersed in the illumination system of the first embodiment is projected on a digital micro-mirror device;

FIG. 3B is a view showing places where light dispersed in the illumination system of the first embodiment is incident on the digital micro-mirror device;

FIG. 4A is a view showing a controlled state of the digital micro-mirror device in the case where only light with a single wavelength, of light with a certain wavelength band, is conducted to the microscope of the illumination system of the first embodiment;

FIG. 4B is a view showing a controlled state of the digital micro-mirror device in which brightness is reduced in the illumination system of the first embodiment;

FIG. 4C is an explanatory view of a principle indicating parts in an on state of the digital micro-mirror device in the case where illumination is achieved with two wavelengths;

FIG. 4D is an explanatory view of a principle indicating parts in an on state of the digital micro-mirror device in the case where a brightness ratio is adjusted in accordance with each wavelength;

DETAILED DESCRIPTION OF THE PREFERRED EMBODIMENTS

Figure 1:
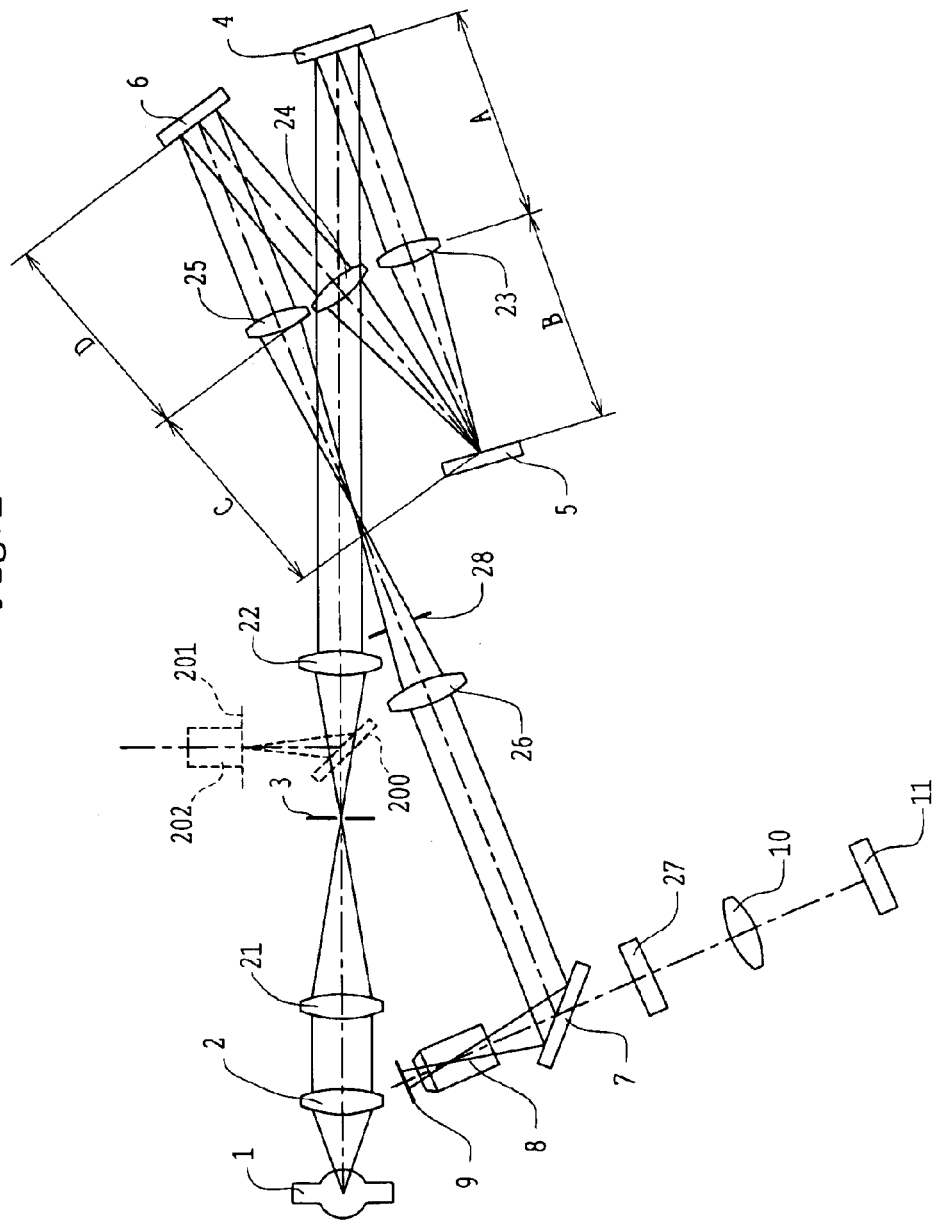
FIG. 1 is a view schematically showing a first embodiment of the illumination system for microscopy according to the present invention.

Before undertaking the description of the embodiments, it will be worthwhile to explain the function of the present invention in reference to FIG. 1.

An illuminating technique in the illumination system of the present invention is first described. Light emitted from a light source 1 is condensed through a collector lens 2 or a reflector, not shown.

Subsequently, the light is conducted to a first spectral element 4 constructed with, for example, a reflection type grating, a transmission type grating, or a prism. The light incident on the first spectral element 4 undergoes wavelength dispersion.

Dispersed light is introduced through a lens 23 into a selectively reflecting member 5. For the selectively reflecting member 5, any reflection type spatial light modulator (SLM) can be used. In actual service, however, the illumination system of the present invention is often used for fluorescence illumination, and hence it is most desirable to use a digital micro-mirror device (DMD) in which light ranging from ultraviolet to visible can be reflected with almost uniform, high reflectance.

The selectively reflecting member 5 is constructed with micro-mirrors two-dimensionally arrayed and is designed so that the reflecting angle of each of them can be changed. Here, reference is made to the function of the micro-mirrors. The micro-mirrors can be electrically switched to an on or off state. In the present invention, the on state refers to the case where the angle of the mirror is electrically set so that light originating from the light source can be directed toward the next optical member, for example, a lens 24 in FIG. 1, and the off state refers to the case where the angle is set so that the light is not directed thereto. In the on state, the light is finally introduced into the microscope and a sample is illuminated. In the off state, on the other hand, the light is not finally introduced into the microscope and fails to illuminate the sample.

The light reflected by the selectively reflecting member 5 such as the DMD is incident on a second spectral element 6 constructed with, for example, a grating. The second spectral element 6 is designed so that light dispersed once through the first spectral element 4 is condensed on the same optical axis. The light condensed on the same optical axis by the second spectral element is reflected by a dichroic mirror 7 and is introduced into an objective lens 8 of the microscope. Consequently, an image of the light source 1, a slit image, or a pinhole image is projected in the proximity of the back focal point of the objective lens 8, and a sample 9 can be finally illuminated.

In the case of the fluorescence illumination, the light reflected by the selectively reflecting member 5 excites the sample 9 as the excitation light. Fluorescent light emanating from the sample 9 due to this excitation is incident on the objective lens 8, and after being transmitted through the dichroic mirror 7 and an absorption filter 27, enters an image sensor 11.

When the optical arrangement of the illumination system is made as mentioned above, the reflecting surface of the selectively reflecting member 5 can be switched in about several tens of milliseconds, and thus the wavelength can be switched at a high speed. As a result, time required for changeover of the excitation wavelength, which is a problem of an ordinary fluorescence microscope, can be reduced and the excitation wavelength can be switched at a speed of several tens of milliseconds. Moreover, the excitation wavelength can be switched by only the on-off operation of the mirror of the selectively reflecting member 5, without using an electric turret for the excitation filter. The use of the selectively reflecting member brings about an optical system in which simultaneous illumination can be achieved with arbitrary wavelengths or a plurality of wavelengths. In addition, the brightness of light of a plurality of wavelengths can be independently adjusted.

Figure 2:
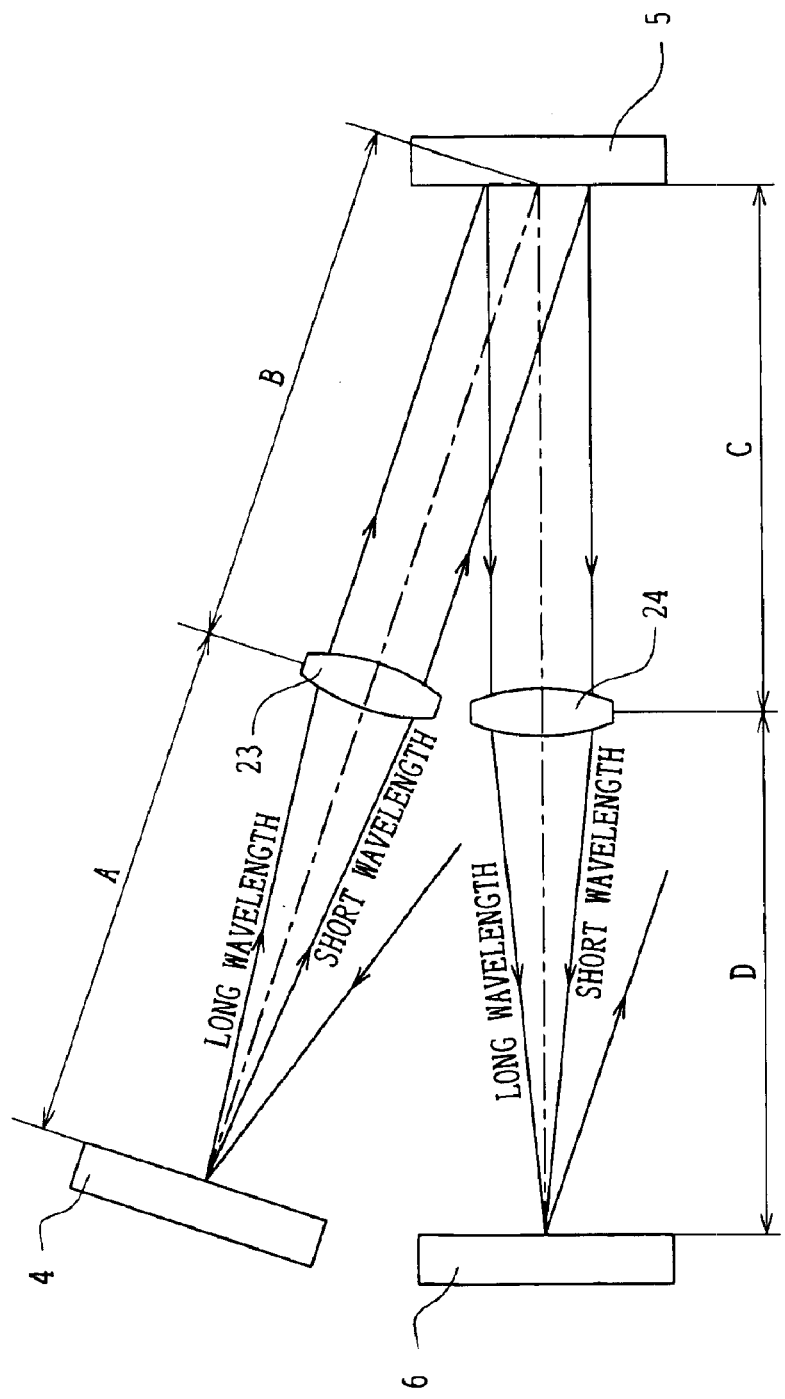
FIG. 2 is an explanatory view showing a state of light dispersed, extending from a short wavelength to a long wavelength, in the illumination system of the first embodiment.

Here, a description is given of the relationship of the arrangement of the first spectral element 4, the selectively reflecting member 5, and the lens 23. FIG. 2 shows the first spectral element 4, the selectively reflecting member 5, and the second spectral element 6 in FIG. 1.

The first spectral element 4 is placed at the front focal point of the lens 23 situated between the first spectral element 4 and the selectively reflecting member 5, and the selectively reflecting member 5 is placed at the back focal point of the lens 23. Whereby, the arc image of the light source 1 or the image of the stop 3 is dispersed and projected on the selectively reflecting member 5.

The selectively reflecting member 5 is placed at the front focal point of the lens 24 situated between the selectively reflecting member 5 and the second spectral element 6, and the second spectral element 6 is placed at the back focal point of a lens 25. Whereby, dispersed light projected on the selectively reflecting member 5 can be combined into one.

In order to satisfy the condition of the relationship of the arrangement mentioned above, a distance A should be made nearly equal to a distance B, where A is the distance between the spectral element 4 and the lens 23 and B is the distance between the selectively reflecting member 5 and the lens 23.

When a distance between the selectively reflecting member 5 and the lens 24 is represented by C and a distance between the spectral element 6 and the lens 24 is represented by D, the distances C and D should be made nearly equal. Otherwise, it becomes difficult to combine again the dispersed light into one.

In general, a spectral device is such that wavelength resolution is governed by the size of the light-emitting point of a lamp. When the wavelength resolution is weakened, a slit or pinhole is introduced into the illumination system, and the arc image of the lamp is projected once on the pinhole. In this case, when the slit is made narrower or the pinhole is made smaller, the wavelength resolution can be improved in design. For example, in FIG. 1, the slit or pinhole is formed on the stop 3.

When a fluorescence microscope, or a spectral microscope, provided with the illumination system of the present invention described above is used, the following function is obtained.

Each of the calcium indicator, ratiometric-pericam, and the pH indicator, pHluorin, prepared on the basis of fura-2, BCT, or GFP (Green Fluorescent Protain), is of a dual wavelength excitation/single wavelength photometry type. The excitation light with two different wavelengths has formerly been alternated by switching the excitation filter. However, when the illumination system of the present invention is used, the problems can be lessened that the switching speed is low, it is hard to control the balance between the intensities of the excitation light with two wavelengths, and the mechanical vibration is produced when the filter is switched.

The need for labeling living cells with a plurality of fluorescence probes to observe simultaneously a plurality of intracellular phenomena has increased. This system is such that the wavelength and intensity of light illuminating the sample can be arbitrarily controlled at a high speed. For example, consider the case where GFP-fusion protein and RFP-fusion protein are developed in a cell to completely acquire two fluorescence signals of such proteins at the same time. When the above system is used, dichromatic illumination light can be easily designed to the reflecting area of a commercially available multidichroicmirror. The advantage of the present invention over a commercially available dual peak excitation filter which has recently appeared lies in the fact that the intensities of the dichromatic illumination light can be adjusted independently.

The intensities can be controlled by two modes, one of which changes the density of light intensity in the sample and the other repeats the on-off operation at certain time intervals with a constant density of light intensity. In view of the mechanism of fading of fluorescent stain in each of the modes (a transfer to a high-order excitation state or a reaction with enzyme molecules), either of them can be chosen with the aim of imaging which brings about minimal fading. Moreover, when glass exhibiting a high transmittance is used as a reflector, illumination light can be arbitrarily chosen in accordance with a fluorescence filter (absorption filter).

When the migration of calcium ions is observed, specifically, for example, in the case where the fluorescent stain of fura 2 is used, two wavelengths of 340 and 380 nm are alternately switched in the illumination system using the DMD and images excited by these wavelengths are photographed to calculate the ratio between them. Whereby, a change in calcium concentration can be imaged without undergoing the influence of the extent of partial dyeing of the fluorescent stain or the fading of the fluorescent stain.

The illumination system of the present invention, which allows illumination with an arbitrary wavelength, can also be used, for example, for the release of the caged compound. For example, the illumination system using the DMD is set to reflect ultraviolet light for illumination of the sample, and thereby the caged compound in the sample can be released. Upon release of the caged compound, the wavelength used in the DMD illumination system is switched to that exciting the fluorescent stain in the sample, and a fluorescent image can be observed.

When a plurality of different fluorescent stains, such as CFP, YFP, and FM1-43, are used to intermittently obtain time-lapse images of the sample for long hours, it is only necessary that the excitation wavelength of the illumination system using the DMD is switched to excite the sample and the images are photographed.

When a mirror reflecting light of a plurality of wavelengths is used instead of the dichroic mirror, the sample can be easily excited by a plurality of wavelengths, for example, even when the sample is stained by the plurality of wavelengths. Alternatively, even though a mirror with a reflectance of 2–60% is used, the sample can be excited by the plurality of wavelengths.

If excitation light is reflected at a reflectance less than 2% to irradiate the sample and a fluorescent image is observed, the excitation light becomes extremely faint and as a result, the fluorescent image of the sample becomes dark. If the excitation light is reflected by a mirror with a reflectance more than 60%, the excitation light can be made bright, but the fluorescent image will be attenuated by as much as 60%. Thus, the fluorescent image cannot be effectively obtained.

The excitation of the sample with a plurality of wavelengths can also be achieved by electrically switching dichroic mirrors reflecting various wavelengths.

According to the present invention, the illumination system can be used for the identification of zero-order fringes in a reflecting interference image and the discrimination of desmosome. Specifically, in the illumination system using the DMD, the spectra of a plurality of different wavelength bands are made and reflecting interference images are photographed in succession. From changes of positions of interference fringes on these images, the zero-order fringes can be easily specified and the desmosome of cells can also be specified. Even in the case where such an observation is carried out, it is not necessary to purchase filters for different wavelengths, and thus an inexpensive experiment can be performed.

Subsequently, the embodiments of the present invention will be described with reference to the drawings.

First Embodiment

FIG. 1 shows the first embodiment of the illumination system for microscopy according to the present invention. The illumination system of the first embodiment has a spectral illumination device using gratings as the spectral elements.

Light emitted from the light source 1 is condensed through the collector lens 2 and a projection lens 21, and is imaged once at the position of the stop 3 provided with a rectangular aperture or a pinhole aperture to form a lamp image. After that, the light passing through the stop 3 is incident on a lens 22 and is projected through the lens 22 at infinity. The light projected at infinity is incident on the grating 4 and is dispersed (wavelength-dispersed), as shown in FIG. 2, extending from a short wavelength to a long wavelength. Dispersed light enters the lens 23 and is conducted to the DMD 5.

FIG. 3A shows a slit of rectangular shape, located at the position of the stop. FIG. 3B shows places of incidence of the dispersed light on the DMD 5.

When the slit is placed at the position of the stop 3, the slit is projected on the DMD in such a way that light is dispersed thereon. The DMD 5 is constructed with a micro-mirror array so that angles of individual mirrors are changed and thereby only light with a desired wavelength is selectively reflected and is introduced into the lens 24. For example, only an partial area of the DMD on which light of the short wavelength is projected is set to an on state and only the light of the short wavelength can be conducted to the sample.

In the lens 24 into which only the light corresponding to the partial area of the DMD 5 in the on state is introduced, a dispersed slit image is projected at infinity. The dispersed slit image projected at infinity enters the grating 6. Light wavelength-dispersed through the grating 6 by the spectrum, after being recombined through the grating 6 and collected on one optical axis, is incident on the lens 25.

This incident light is formed once as the image of the stop 3 through the lens 25, and after passing through a field stop 28, is projected through a lens 26 and reflected by the dichroic mirror 7. The reflected image of the stop 3 is formed at the back focal point of the objective lens 8. The illumination system provides Koehler illumination on the surface of the sample 9 to illuminate the sample 9.

When the illumination system is used for fluorescence observation, illumination light excites the sample 9 as excitation light, and fluorescent light emanating from the sample 9 is transmitted through the dichroic mirror 7, passes through the absorption filter 27 cutting off leakage light of the excitation light, and is imaged through an imaging lens 10 on a CCD 11.

Here, reference is made to a method of controlling the wavelength of light by the DMD.

FIGS. 4A–4D illustrate the principle where the wavelength of light is controlled by the DMD. In these figures, "ON" surrounded by a line indicates the partial area of the DMD set to the on state. FIG. 4A shows a controlled state of the DMD in the case where only light with a single wavelength, of light with a certain wavelength band, is conducted to a microscope. As shown in FIG. 4A, when a partial area of the DMD 5 is turned on, only light of a particular wavelength can be conducted to the microscope. In this case, all the elements of the DMD in a vertical direction are turned on and thereby the sample can be illuminated with the maximum brightness.

There are two methods of reducing the brightness. The first method is to oscillate the mirrors at a higher frequency than in the exposure time of the microscope so that the time ratio between on and off operations is controlled and thereby the brightness is adjusted. The second method, as shown in FIG. 4B, is to adjust the amount of light by partially turning the DMD on.

FIG. 4C shows partial areas of the DMD in an on state where illumination is achieved with two wavelengths. In order to adjust the brightness ratio in accordance with the wavelength, as shown in FIG. 4D, it is only necessary to control the partial areas of "ON" of the DMD.

When the illumination system is used as an ordinary reflecting spectral illumination system, it is only necessary to use a half mirror instead of the dichroic mirror 7. When the illumination system is used for fluorescence observation, a multi-excitation filter or a glass plate with a reflecting function of approximately 4% may be used instead of the dichroic mirror.

The illumination system of the present invention can also be used for confocal illumination. In this case, an optical arrangement must be set so that the stop 3 and the surface of the sample are conjugate. For this reason, it is necessary that the stop 3 is projected at the focal point of the lens 26 and illumination is performed to be infinite between the lens 26 and the objective lens 8. In addition, there is the need to place a beam splitting means 200 (indicated by a broken line in FIG. 1), such as a half mirror or dichroic mirror splitting the optical path or a known filter for transmitting or reflecting only light with a particular wavelength, between the collector lens 2 and the lens 22 for illumination. Light from the sample 9 passes through the lens 22, and after being conducted by the beam splitting means 200 in a direction different from that of the light source 1, passes through a stop 201 conjugate with the sample so that the light can be received by a photodetector 202 (indicated by a broken line in FIG. 1). The light source 1 may be constructed in such a way that a laser oscillator is combined with an optical fiber whose exit end face is placed at the focal point of the collector lens 2.

By such a construction, the illumination system of the present invention can be designed to be a confocal system.

Second Embodiment

Figure 5:
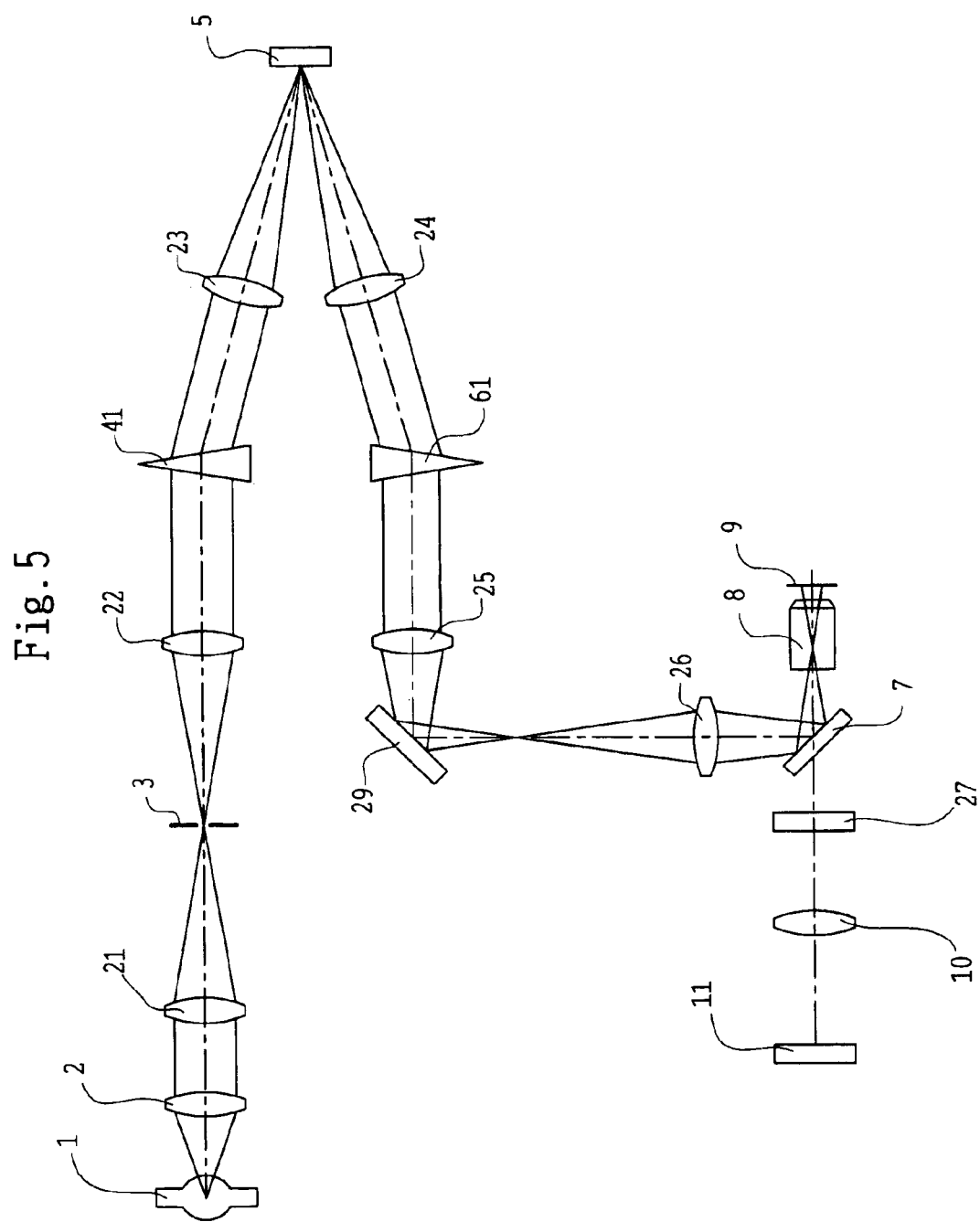
FIG. 5 is a view schematically showing a second embodiment of the illumination system for microscopy according to the present invention.

FIG. 5 shows the second embodiment of the illumination system for microscopy according to the present invention. The illumination system of the second embodiment has a spectral illumination device using prisms as the spectral elements.

Light emitted from the light source 1 is condensed through the collector lens 2 and the source projection lens 21, and is imaged once in the proximity of the stop 3 provided with a rectangular aperture or a pinhole aperture to form a lamp image. After that, illumination light passing through the stop 3 is projected through the lens 22 at infinity and is dispersed through a prism 41. In this case, dispersion extends from the short wavelength to the long wavelength as in the illumination system of the first embodiment shown in FIG. 2.

Dispersed light is projected, through the lens 23, on the DMD 5 as the dispersed image of the stop 3. Light selectively reflected by the DMD 5 is transmitted through the lens 24 and is incident on a prism 61. The light transmitted through the prism 61 is dispersed in the reverse direction by the prism and as a result, the dispersed light incident on the prism 61 is recombined to enter the lens 25.

The state where the dispersed light is conducted to the DMD 5 and the control of the wavelength of light by the DMD are the same as in the first embodiment shown in FIGS. 3A and 3B and FIGS. 4A–4D.

The light incident on the lens 25 is formed as the image of the stop 3 by the lens 25. In this case, the illumination light is reflected by a mirror 29 in order to introduce the illumination light into the microscope. The light reflected by the mirror 29 is incident on the illumination lens 26 and after being reflected by the dichroic mirror 7, is conducted to the objective lens 8 to excite the sample 9.

Light emanating as fluorescent light from the sample 9 is changed through the objective lens 8 to an infinite beam of light, which is transmitted through the dichroic mirror 7 and after passing through the absorption filter 27 cutting off leakage light of the excitation light, is imaged through an imaging lens 10 on a CCD 11.

Third Embodiment

Figure 6:
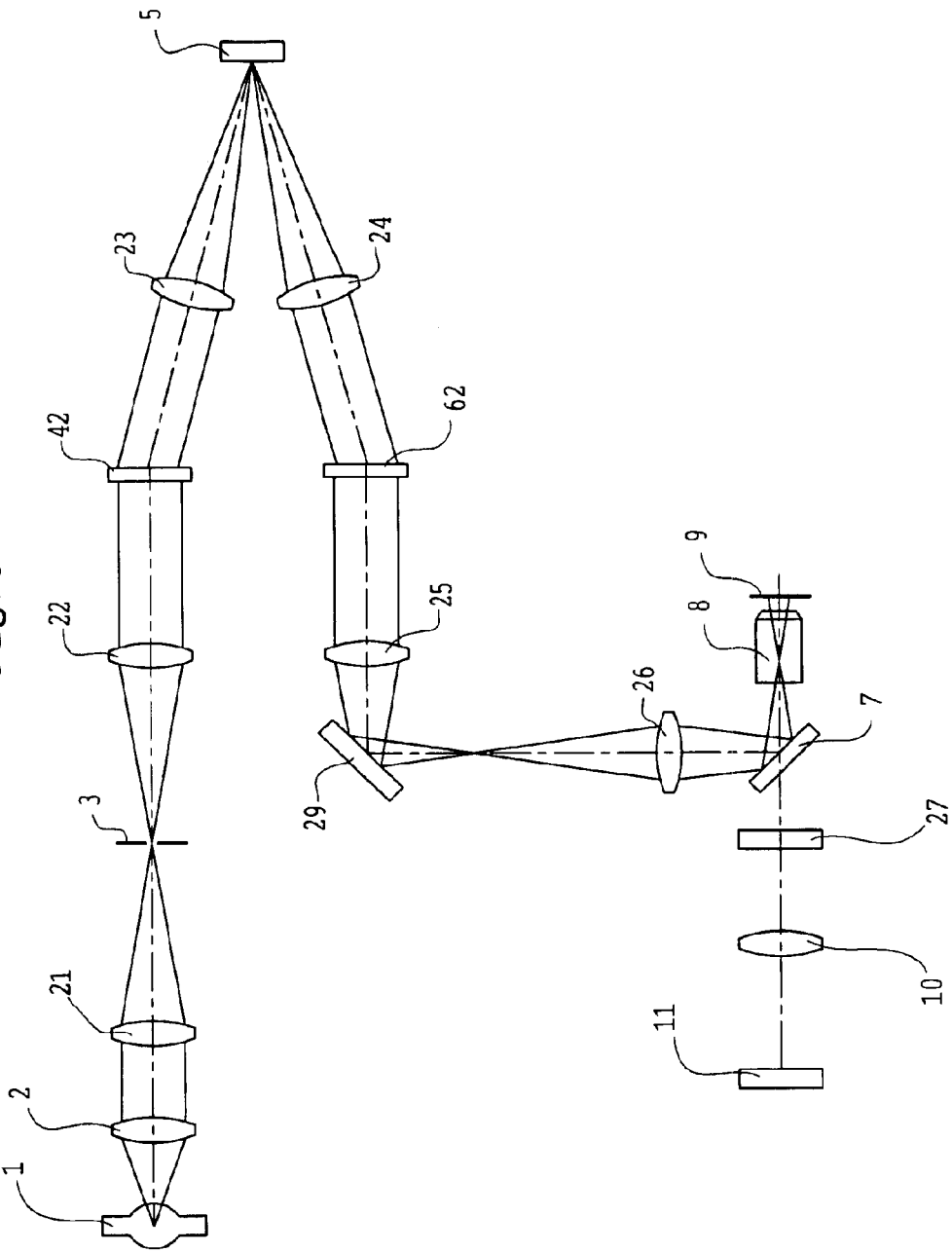
FIG. 6 is a view schematically showing a third embodiment of the illumination system for microscopy according to the present invention.

FIG. 6 shows the third embodiment of the illumination system for microscopy according to the present invention. The illumination system of the third embodiment has a spectral illumination device using transmission type gratings as the spectral elements.

Light emitted from the light source 1 is condensed through the collector lens 2 and the source projection lens 21, and is imaged once at the position of the stop 3 provided with a rectangular aperture or a pinhole aperture to form a lamp image. Then, the light passes through the stop 3, and after being projected through the lens 22 at infinity, is dispersed through a transmission type grating 42. In this case, dispersion extends from the short wavelength to the long wavelength as in the illumination system of the first embodiment shown in FIG. 2.

Dispersed light is incident on the lens 23 and is projected as the image of the stop 3 on the DMD 5. Light selectively reflected by the DMD 5 is transmitted through the lens 24 and is incident on a transmission type grating 62. The light is dispersed in the reverse direction through the transmission type grating 62 and as a result, this dispersed light is recombined and then enters the lens 25.

The state where the dispersed light is conducted to the DMD 5 and the control of the wavelength of light by the DMD are the same as in the first embodiment shown in FIGS. 3A and 3B and FIGS. 4A–4D.

The light incident on the lens 25 is formed as the image of the stop 3 by the lens 25. In this case, illumination light is reflected by the mirror 29 in order to introduce the illumination light into the microscope. The light reflected by the mirror 29 is incident on the illumination lens 26 and after being reflected by the dichroic mirror 7, is conducted to the objective lens 8 to excite the sample 9.

Fluorescent light thus emanating from the sample 9 is changed through the objective lens 8 to an infinite beam of light, which is transmitted through the dichroic mirror 7 and after passing through the absorption filter 27 cutting off leakage light of the excitation light, is imaged through an imaging lens 10 on a CCD 11.

Fourth Embodiment

Figure 7:
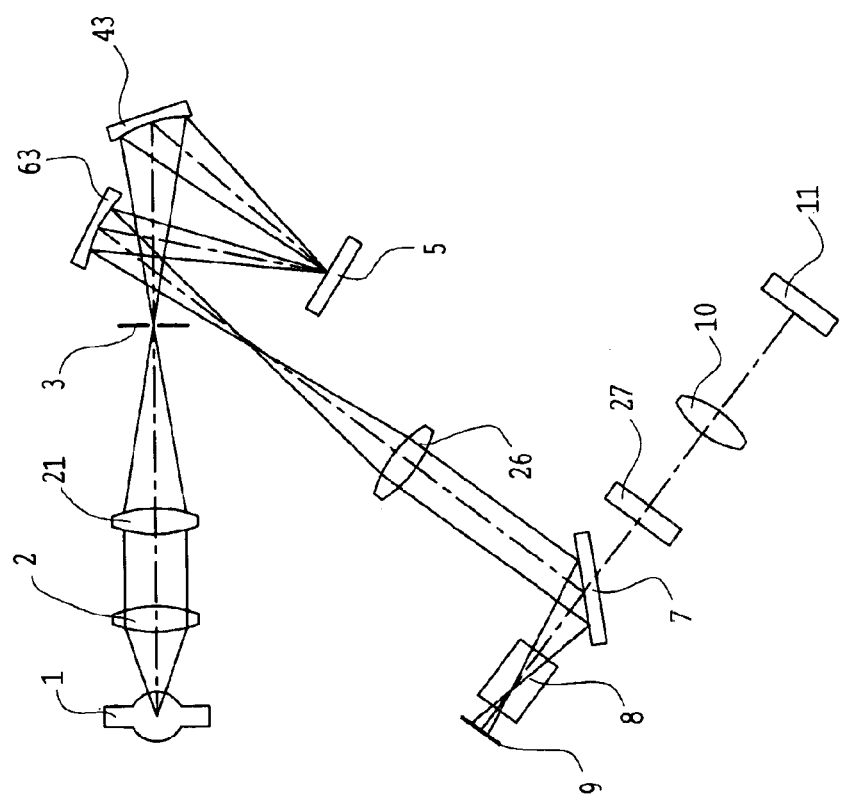
FIG. 7 is a view schematically showing a fourth embodiment of the illumination system for microscopy according to the present invention.

FIG. 7 shows the fourth embodiment of the illumination system for microscopy according to the present invention. The illumination system of the fourth embodiment is constructed so that each of a first spectral element 43 and a second spectral element 63 is used as a grating which has a power by itself and so that the lenses 22–25 in the first embodiment of FIG. 1 are not provided. Moreover, in the fourth embodiment, the DMD 5 is such that each of micromirrors can be actuated at an arbitrary angle in order to direct reflected light toward the grating 63.

Light emitted from the light source 1 is condensed through the collector lens 2 and the source projection lens 21, and is imaged once at the position of the stop 3 provided with a rectangular aperture or a pinhole aperture to form a lamp image. After that, the light passes through the stop 3 and is dispersed through the reflection type grating 43 with power. In this case, dispersion extends from the short wavelength to the long wavelength as in the illumination system of the first embodiment shown in FIG. 2.

Dispersed light is projected as the image of the stop 3 on the DMD 5. Light selectively reflected by the DMD 5 is incident on the reflection type grating 63 with power, and the light dispersed through the reflection type grating 63 is recombined. The state where the dispersed light is conducted to the DMD 5 and the control of the wavelength of light by the DMD are the same as in the first embodiment shown in FIGS. 3A and 3B and FIGS. 4A–4D.

Recombined light is projected, through the lens 26, as the image of the stop 3 on the dichroic mirror 7, and after being reflected by the dichroic mirror 7, is imaged at the back focal point of the objective lens 8. The illumination light conducted to the objective lens 8 excites the sample 9.

Fluorescent light thus emanating from the sample 9 is changed through the objective lens 8 to an infinite beam of light, which is transmitted through the dichroic mirror 7 and after passing through the absorption filter 27 cutting off leakage light of the excitation light, is imaged through an imaging lens 10 on a CCD 11.

Fifth Embodiment

Figure 8:
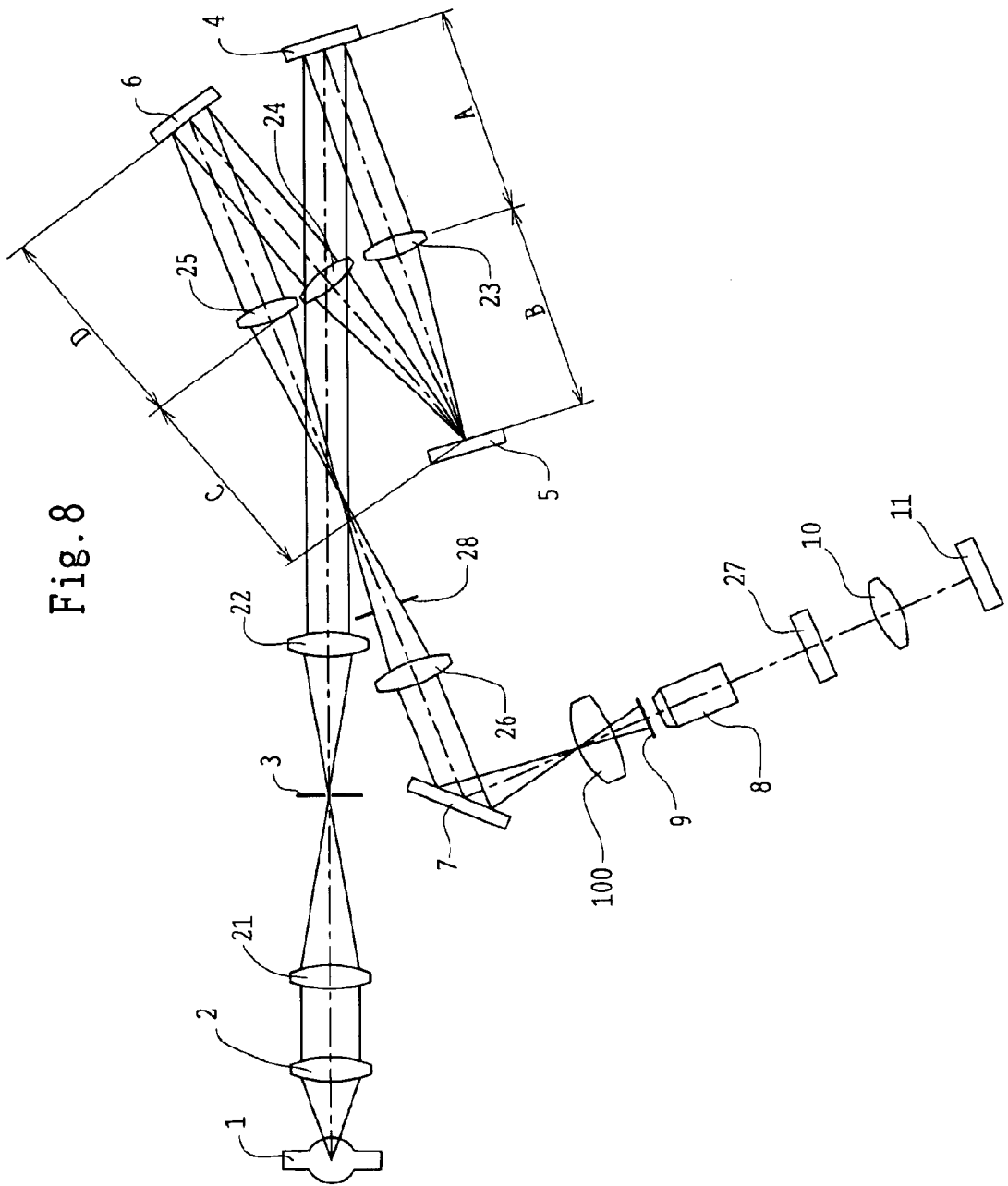
FIG. 8 is a view schematically showing a fifth embodiment of the illumination system for microscopy according to the present invention.

FIG. 8 shows the fifth embodiment of the illumination system for microscopy according to the present invention. The illumination system of the fifth embodiment has the same arrangement as each of the above embodiments which uses a reflecting illumination system with the exception that a transmitting illumination system is used. In FIG. 8, like numerals are used for like optical members with respect to the functions of the members shown in FIG. 1. In this embodiment, light passing through the lens 26 is imaged at the front focal point of a condenser lens 100. The illumination system provides Koehler illumination on the surface of the sample 9 to illuminate the sample 9.

Such a transmitting illumination system brings about the same effect as the reflecting illumination system of each embodiment mentioned above.

What is claimed is:

1. An illumination system for microscopy, comprising:

a light source illuminating a sample;

a first spectral element dispersing light from the light source;

a selectively reflecting member including a plurality of micromirrors selectively reflecting light dispersed by the first spectral element;

a second spectral element for combining light reflected by the selectively reflecting member to direct the light toward the sample;

an objective lens transmitting light emanating from said sample;

an image sensor receiving light passing through objective lens, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

2. An illuminating system according to claim 1, wherein the first spectral element is constructed with one of a reflection type grating, a transmission type grating, and a prism.

3. An illuminating system according to claim 1, wherein the second spectral element is constructed with one of a reflection type grating, a transmission type grating, and a prism.

4. An illuminating system according to claim 1, wherein the selectively reflecting member is constructed with a digital micro-mirror device or a spatial light modulator.

5. An illumination system according to claim 1, wherein a reflecting angle of the selectively reflecting member is controlled in terms of time and thereby time required to irradiate the sample with illumination light can be controlled.

6. An illumination system according to claim 1, wherein a stop is interposed between the light source and the first spectral element and the selectively reflecting member is placed at a position substantially conjugate with a pupil position of the objective lens.

7. An illumination system according to claim 1, wherein each of the first spectral element and said second spectral element includes a grating having a power by itself.

8. An illumination system for microscopy, comprising:

a light source illuminating a sample;

a first spectral element dispersing light from the light source;

a selectively reflecting member including a plurality of micromirrors selectively reflecting light dispersed by the first spectral element;

a second spectral element combining light reflected by the selectively reflecting member;

a mirror reflecting light of a plurality of wavelengths from the second spectral element;

an objective lens transmitting light reflected by the mirror;

an image sensor receiving light emanating from the sample and passing through the objective lens and the mirror, and wherein a first lens is interposed between the first spectral element and the selectively reflecting member and a second lens is interposed between the selectively reflecting member and the second spectral element, the first spectral element being placed a front focal point of the first lens, the selectively reflecting member being placed at a position where a back focal point of the first lens coincides with a front focal point of the second lens, and the second spectral element being placed at a back focal point of the second lens.

9. An illumination system for microscopy, comprising:

a light source illuminating a sample;

a first spectral element dispersing light from the light source;

a selectively reflecting member including a plurality of micromirrors selectively reflecting light dispersed by the first spectral element;

a second spectral element combining light reflected by the selectively reflecting member;

a mirror having a reflectance of 2–60%, reflecting light of wavelength from the second spectral element;

an objective lens transmitting light reflected by the mirror;

an image sensor receiving light emanating from the sample and passing through the objective lens and said the mirror, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

10. An illumination system for microscopy, comprising:

a light source illuminating a sample;

a first spectral element dispersing light from the light source;

a selectively reflecting member including a plurality of micromirrors selectively reflecting light dispersed by first spectral element the selectively reflecting member being constructed so that angles of the plurality of micromirrors for reflection are freely changeable as required to conduct light to an objective lens;

a second spectral element combining light reflected by the selectively reflecting member to direct the light toward the sample;

a dichroic mirror reflecting light from the second spectral element;

an objective lens transmitting light reflected by the dichroic mirror;

an image sensor receiving light emanating from the sample and passing through the objective lens and the dichroic mirror, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

11. An observation or measuring method using an illumination system for microscopy, wherein a sample in which a dual-wavelength excitation/single-wavelength photometry type indicator is introduced into a molecule or a molecule inside a cell is observed or measured by using the illumination system comprising:

a light source illuminating a sample;

a first spectral element dispersing light from the light source;

a selectively reflecting member including a plurality of micromirrors selectively reflecting light dispersed by the first spectral element;

a second spectral element for combining light reflected by the selectively reflecting member to direct the light toward said sample;

an objective lens transmitting light emanating from the sample;

an image sensor receiving light passing through the objective lens, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

12. An observation or measuring method using an illumination system for microscopy, wherein a sample in which a dual-wavelength excitation/single-wavelength photometry type indicator is introduced is observed or measured by using the illumination system comprising:

a light source illuminating a sample;

a first spectral element dispersing light from the light source;

a selectively reflecting member including a plurality of micromirrors selectively reflecting light dispersed by the first spectral element;

a second spectral element for combining light reflected by the selectively reflecting member to direct the light toward said the sample;

an objective lens transmitting light emanating from the sample;

an image sensor receiving light passing through the objective lens, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

13. An observation or measuring method using an illumination system for microscopy, wherein a sample in which a calcium indicator prepared on the basis of fura-2, BTC, or green fluorescent protein, ratiometric-pericam, or a pH indicator (pHluorin) is introduced into a dual-wavelength excitation/single-wavelength photometry type indicator is observed or measured by using the illumination system comprising:

a light source illuminating a sample;

a first spectral element dispersing light from the light source;

a selectively reflecting member including a plurality of micromirrors selectively reflecting light dispersed by the first spectral element;

a second spectral element for combining light reflected by the selectively reflecting member to direct the light toward the sample;

an objective lens transmitting light emanating from the sample;

an image sensor receiving light passing through the objective lens, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

14. An illumination system for microscopy, comprising:

a light source illuminating a sample;

a first spectral element dispersing light from the light source;

a selectively reflecting member including a plurality of micromirrors selectively reflecting light dispersed by the first spectral element;

a second spectral element for combining light reflected by the selectively reflecting member to direct the light toward the sample;

a dichroic mirror reflecting light from the second spectral element;

an objective lens transmitting light reflected by the dichroic mirror;

an image sensor receiving light emanating from the sample and passing through the objective lens and said dichroic mirror, and wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of the second lens, and the second spectral element being placed at a back focal point of the second lens.

15. An illumination system for microscopy, comprising:

a light source illuminating a sample;

a first spectral element dispersing light from light source;

a selectively reflecting member selectively reflecting light dispersed by the first spectral element;

a second spectral element for combining light reflected by the selectively reflecting member to direct the light toward the sample;

an objective lens transmitting light emanating from the sample; and an image sensor receiving light passing through the objective lens, wherein a first lens is interposed between the first spectral element and the selectively reflecting member and a second lens is interposed between the selectively reflecting member and the second spectral element, the first spectral element being placed at a front focal point of the first lens, the selectively reflecting member being placed at a position where a back focal point of the first lens coincides with a front focal point of said second lens, and the second spectral element being placed at a back focal point of the second lens.

* * * * *